United States Patent
Colban

(10) Patent No.: US 6,956,860 B1
(45) Date of Patent: Oct. 18, 2005

(54) FACSIMILE SERVICES IN MOBILE NETWORKS

(75) Inventor: Erik A. Colban, Oslo (NO)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1007 days.

(21) Appl. No.: 09/588,598

(22) Filed: Jun. 7, 2000

(30) Foreign Application Priority Data

Jun. 8, 1999 (NO) .......................................... 992775

(51) Int. Cl.⁷ .......................................... H04L 12/56
(52) U.S. Cl. ................................... 370/401; 455/557
(58) Field of Search ..................... 370/395.5, 395.52, 370/401, 466, 467, 469, 352, 356, 328, 350, 370/465; 455/557

(56) References Cited

U.S. PATENT DOCUMENTS

| | | | | |
|---|---|---|---|---|
| 6,057,943 A * | 5/2000 | Kweon et al. | ............... | 358/435 |
| 6,134,439 A * | 10/2000 | Sipila et al. | ................ | 455/436 |
| 6,230,024 B1 * | 5/2001 | Wang et al. | ................. | 455/557 |
| 6,385,195 B2 * | 5/2002 | Sicher et al. | ............... | 370/356 |
| 6,519,458 B2 * | 2/2003 | Oh et al. | .................... | 455/445 |
| 6,542,490 B1 * | 4/2003 | Ahmadvand et al. | ........ | 370/338 |
| 6,631,122 B1 * | 10/2003 | Arunachalam et al. | ...... | 370/332 |

OTHER PUBLICATIONS

"Procedures for real-time Group 3 facsimile communication over IP networks," ITU-T, Series T: Terminals for Telematic Services, T.38, (Jun. 1998).
"Procedures for real-time Group 3 facsimile communication over IP networks," ITU-T, Series T: Terminals for Telematic Services, T.38, Amendment 1 (Apr. 1999).
"Digital cellular telecommunications system; Technical realization of facsimile group 3 non-transparent," ETSI TC-SMG (GSM 03.46) Nov. 1996.
"Procedures for the transfer of facsimile data via store-and-forward on the Internet," ITU-T, Series T: Terminals for Telematic Services, T.37, (Jun. 1998).
"3ʳᵈ Gerneration Partnership Project; Technical Specification Group Core Network; Technical Realization of Facsimile Group 3 Non-Transparent," (Release 2000) 3G TS 23.146 V4.0.0 (2000-06), 3GPP.

* cited by examiner

*Primary Examiner*—Man U. Phan
*Assistant Examiner*—Toan Nguyen

(57) ABSTRACT

A system, mobile fax terminal, and method for providing fax service for mobile networks. A fax adapter receives fax data from a fax machine via standard fax protocols, maps the fax data onto Transmission Control Protocol (TCP) or User Datagram Protocol (UDP) packets, and sends the mapped data over an Internet Protocol (IP)-based interface to a mobile phone portion. The mobile phone portion maps the TCP or UDP packets onto Radio Link Protocol (RLP) frames, and transmits the RLP frames to an external radio telecommunication network.

8 Claims, 1 Drawing Sheet

FACSIMILE SERVICES IN MOBILE NETWORKS

TECHNICAL BACKGROUND

The Problem Area

Problems with facsimile services in mobile networks are experienced due to the quality of the radio transmission. Longer delays and higher bit error rates than in the PSTN (Public Switched Telephone Network) cause facsimile transactions to fail more frequently in a mobile environment than in the PSTN. There are ways to avoid some of these failures, but which methods are the best is a subject for debate. The problem is to find a common platform to be standardised that will enable diverse competing solutions to be applied.

PRIOR ART

Facsimile services can be divided into two main categories. One is where the facsimile messages are both transmitted and acknowledged within one session. This kind of services is referred to as real-time fax. Another category is so called store-and-forward fax, where the facsimile is stored in a fax-box and transmitted to or from the mobile user by use of a file or message transfer program, for instance, e-mail.

The latter category lacks the feature of "immediate delivery", which in many occasions is seen as quite desirable, and therefor fails to meet a requirement that is often exhibited. This category will not be considered further in this document.

There are various standardised solutions for real-time fax in mobile networks. In GSM, there are two; a transparent and a non-transparent fax service. Although both have been standardised, the non-transparent service is not in use because the transactions often fail. For this reason, the transparent fax solution is applied in GSM. However, in the PDC networks in Japan, a non-transparent fax serviced is used, which may be due to a better fax service specification in PDC than in GSM. Several actors in the PDC market have proposed to produced an enhanced version of the GSM non-transparent fax service specification for the $3^{rd}$ generation mobile networks. The enhancements are to be based on the PDC standard.

In the Internet community, facsimile transmission over IP (Internet Protocol), usually referred to as IPfax, has been standardised. There are IPfax solutions for both real-time and store-and-forward. In ITU-T (International Telecommunication Union), these solutions have been captured in the T.38 and T.37 Recommendations respectively.

The T.38 recommendations specifies how the messages of the PSTN fax protocols (T.30 and T.4) are to be mapped onto IP. Delays occur in IP networks due to congestion. T.38 does not specify how these delays are to be handled for successful delivery of facsimiles; this is left to implementation. T.38 has therefore the wanted characteristics of a standard that allows competing solutions to evolve.

Problems with Known Solutions

All fax service specifications for mobile networks, either for GSM or PDC or other, are very specific and constrain which solutions are possible. On one hand this has the advantage that the necessary software and hardware one the mobile side and that on the network side, can be provided independently yet allowing interoperability. On the other hand, any defects in the standards will penetrate all implementations of them and even small improvements may necessitate changes in the standards.

The real-time IPfax solutions apply to IP and it is currently not straight-forward to apply them to mobile networks. Real-time IPfax, does not specify how to handle delays in the IP network or high bit error rates. Moreover, IPfax does not specify how a mobile terminated call can be accomplished, since there are addressing issues to be solved.

THE INVENTION

SUMMARY OF THE INVENTION

The problems with the prior art solutions mentioned above is solved in a fax solution for mobile networks according to the present invention. According to the invention there is introduced an additional layer in the network for transporting fax messages. The additional layer, is based on known IP protocols for fax transfer.

The advantage of this solution is that the fax transport protocol is tightly specified in the T.38 recommendation, which is an accepted standard, while the transfer mechanisms in the deeper layers are left to the preferences of the service provider. Users can easily adapt to different service providers.

The exact scope of the present invention is defined in the appended patent claims.

DRAWINGS

DETAILED DESCRIPTION OF THE INVENTION

Figure 1:
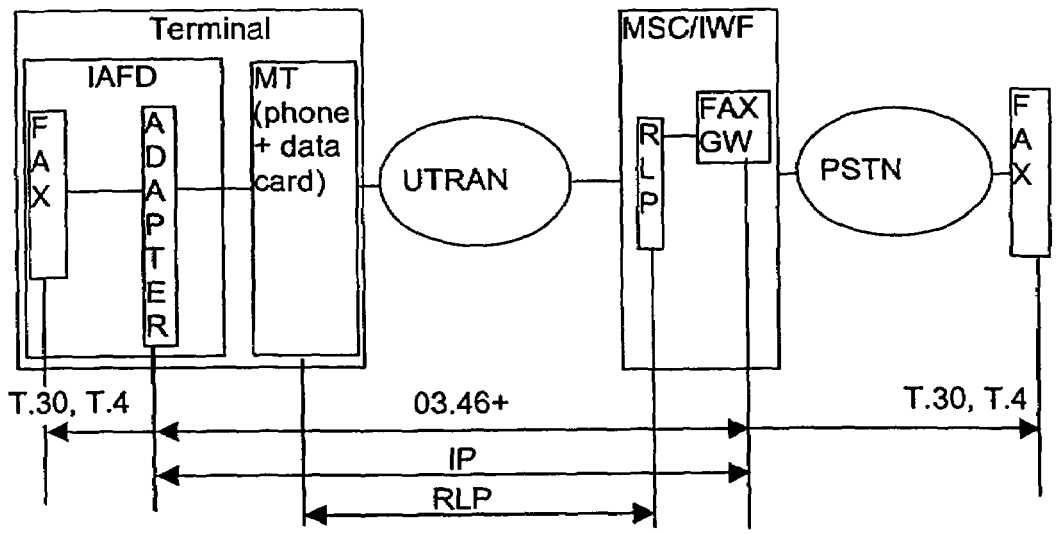
FIG. 1 illustrates the architecture and protocol stack for real-time facsimile service according to the present invention.

The invention is of a fax service for mobile networks where the messages of the fax protocol (T.4 and T.30) are transported over an IP layer in the mobile network. The ITU-T T.38 protocol specifies how T.30 and T.40 is transported over the IP layer. The principles for overcoming long delays and errors described in GSM Technical Specification 03.46 (Non-transparent facsimile), or any enhancement thereof, are applied. Other implementation specific mechanisms can also be applied. These mechanisms are henceforth referenced in this document as 03.46+. The actual mechanisms of 03.46+are out of the scope of this invention. The invention's core idea is to map the facsimile messages onto TCP or UDP packets and, in turn, map these packets onto the Radio Link Protocol (RLP) frames according to T.38, instead of mapping them directly onto RLP frames. TCP/IP header compression can be applied in order to reduce overhead. FIG. 1 illustrates the protocol stack.

Call set-up and call control procedures are according to the protocol for existing data and fax services in the mobile network.

The terminal has two internal interfaces. First there is the interface between the Fax and the Adapter allowing a standard fax machine to be attached to the terminal. The other internal interface is between the "phone" and the adapter. This is an asynchronous (V.24) interface allowing transport of IP packets. The Fax and the adapter can be bundled into one product, a so-called Internet Aware Facsimile Device (IAFD), either as a special purpose fax machine or as a PC-like device. In case of a PC device, the adapter may be in form of downloadable software.

The adapter in the terminal and the fax gateway in the IWF are peers. (The Fax GW could alternatively have be called an adapter. Fax GW is chosen here to be compliant with T.38 terminology.) The 03.46+ is applied between the two peers. Note that, when 03.46+ maps fax protocol messages onto IP, it becomes an instance of T.38.

The 03.46+ protocol would specify how to handle delays and high error bit rates, and call set-up is not a problem either, since the call set-up procedure for fax calls in GSM or the actual mobile network can be applied. Therefor, 03.46+ and T.38 can be said to complement each other.

Advantages

Figure 2:
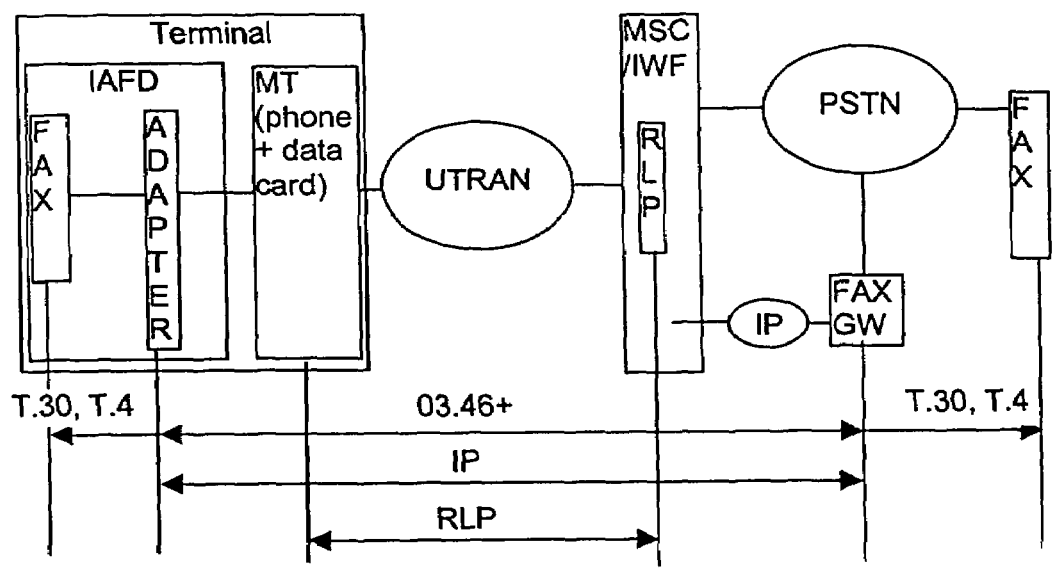
FIG. 2 illustrates an embodiment of the present invention where the fax gateway is separated from MSC by an IP network.

An immediate advantage is that a split in the market, where irreconcilable solutions for fax in mobile networks may appear, can be avoided. If different solutions for the 03.46+ are implemented, users may easily adjust their equipment to different service providers by downloading the required adapter software (this applies to the case where the IAFD is a PC-like device). Another benefit is that the Fax Gateway could easily (once the addressing issues are solved) be moved across an IP network, as shown in FIG. 2. No additional conversion is needed since the 03.46+ already is on an IP format. It also facilitates an evolution from 03.46+ to alternative instances of T.38, thus benefiting from the wider market that the Internet constitutes and its possibly cheaper and better products. The solution can also be adopted to packet switched transmission in the mobile network.

What is claimed is:

1. A mobile fax terminal comprising:
    a fax adapter; and
    a mobile phone portion connected to the fax adapter via an Internet Protocol (IP)-based interface;
    wherein the fax adapter includes:
        a fax interface for receiving fax data from a fax machine via standard fax protocols;
        a mapping function that maps the fax data onto Transmission Control Protocol (TCP) or User Datagram Protocol (UDP) packets; and
        means for sending the mapped data over the IP-based interface to the mobile phone portion; and
    wherein the mobile phone portion includes:
        a mapping function that maps the TCP or UDP packets received from the fax adapter onto Radio Link Protocol (RLP) frames; and
        a radio air interface function that transmits the RLP frames to an external radio telecommunication network.

2. The mobile fax terminal of claim 1, wherein the fax adapter receives the fax data from an external fax machine.

3. The mobile fax terminal of claim 1, wherein the fax adapter and the fax machine are both implemented in the mobile fax terminal.

4. The mobile fax terminal of claim 1, wherein the fax adapter and the fax machine are both implemented in an Internet Aware Fax Device (IAFD) that connects to the mobile phone portion via the IP-based interface.

5. The mobile fax terminal of claim 1, wherein the fax adapter is implemented through software.

6. A system for providing non-transparent fax services in a mobile network, said system comprising:
    a mobile fax terminal comprising:
        means for receiving fax data from a fax machine via standard fax protocols;
        means for mapping the fax data onto Transmission Control Protocol (TCP) or User Datagram Protocol (UDP) packets;
        means for mapping the TCP or UDP packets onto Radio Link Protocol (RLP) frames; and
        means for transmitting the RLP frames to an external radio telecommunication network;
    an interworking function (IWF) in the network comprising:
        means for receiving the RLP frames from the mobile fax terminal;
        means for mapping the RLP frames to TCP or UDP packets; and
        means for sending the TCP or UDP packets to a fax gateway; and
    a fax gateway comprising:
        means for receiving the TCP or UDP packets from the IWF;
        means for mapping the packets to standard fax data; and
        means for sending the fax data to a destination fax machine via standard fax protocols.

7. A method of providing non-transparent fax services in a mobile network, said method comprising the steps of:
    within a mobile fax terminal, performing the steps of:
        receiving fax data from a fax machine via standard fax protocols;
        mapping the fax data onto Transmission Control Protocol (TCP) or User Datagram Protocol (UDP) packets;
        mapping the TCP or UDP packets onto Radio Link Protocol (RLP) frames; and
        transmitting the RLP frames to an external radio telecommunication network; and
    within an interworking function (IWF) in the network, performing the steps of:
        receiving the RLP frames from the mobile fax terminal;
        mapping the RLP frames to TCP or UDP packets; and
        sending the TCP or UDP packets to a fax gateway.

8. The method of claim 7, further comprising the steps of:
    within the fax gateway, performing the steps of
        receiving the TCP or UDP packets from the IWF;
        mapping the packets to standard fax data; and
        sending the fax data to a destination fax machine via standard fax protocols.

* * * * *